(12) United States Patent
Nozaki

(10) Patent No.: US 7,984,781 B2
(45) Date of Patent: Jul. 26, 2011

(54) UNDER-SEAT STRUCTURE OF VEHICLE

(75) Inventor: Naoki Nozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 682 days.

(21) Appl. No.: 11/510,662

(22) Filed: Aug. 28, 2006

(65) Prior Publication Data

US 2007/0045016 A1 Mar. 1, 2007

(30) Foreign Application Priority Data

Aug. 31, 2005 (JP) ................................. 2005-291671

(51) Int. Cl.
*B62D 25/00* (2006.01)
(52) U.S. Cl. .................... 180/69.24; 180/908; 180/89.17
(58) Field of Classification Search ................. 180/69.2, 180/69.24; 296/37.15
See application file for complete search history.

(56) References Cited

U.S. PATENT DOCUMENTS

| | | | | |
|---|---|---|---|---|
| 4,487,283 A | * | 12/1984 | Suzuki et al. | 180/219 |
| 5,449,305 A | * | 9/1995 | Kobayashi et al. | 440/38 |
| 5,839,930 A | * | 11/1998 | Nanami et al. | 440/88 L |
| 6,071,158 A | * | 6/2000 | Mashiko | 440/88 R |
| 6,530,336 B2 | * | 3/2003 | Ibata et al. | 114/55.5 |
| 6,622,806 B1 | * | 9/2003 | Matsuura | 180/68.1 |
| 6,648,093 B2 | * | 11/2003 | Rioux et al. | 180/291 |
| 6,732,700 B2 | * | 5/2004 | Suganuma | 123/196 R |
| 7,134,519 B2 | * | 11/2006 | Imashige | 180/69.24 |
| 2005/0083208 A1 | * | 4/2005 | Konno et al. | 340/825.72 |

FOREIGN PATENT DOCUMENTS

| | | |
|---|---|---|
| JP | 59-94980 U | 6/1984 |
| JP | 63-21182 U | 2/1988 |
| JP | 64-48381 U | 3/1989 |
| JP | 02-158420 A | 6/1990 |
| JP | 3-213427 A | 9/1991 |
| JP | 10-81261 A | 3/1998 |
| JP | 11278159 A * | 10/1999 |

* cited by examiner

*Primary Examiner* — Hau V Phan
*Assistant Examiner* — Katy Meyer
(74) *Attorney, Agent, or Firm* — Birch, Stewart, Kolasch & Birch, LLP

(57) ABSTRACT

An underseat structure of a road vehicle which protects an occupant from engine heat while enhancing the maintenance property of a vehicle which includes an engine supported on a vehicle body frame, and an engine oil supply pipe and an oil level gauge mounted on the engine, wherein the engine is disposed below at least one seat. An inner cover is disposed between the at least one seat and the engine and a maintenance lid is provided for allowing maintenance of the engine oil supply pipe and the oil level gauge formed on the inner cover with the inner cover being detachably mounted on the vehicle body frame.

22 Claims, 7 Drawing Sheets

UNDER-SEAT STRUCTURE OF VEHICLE

CROSS-REFERENCE TO RELATED APPLICATIONS

The present application claims priority under 35 USC 119 to Japanese Patent Application No. 2005-291671 filed on Aug. 31, 2005 the entire contents of which are hereby incorporated by reference.

BACKGROUND OF THE INVENTION

1. Field of the Invention

The present invention relates to an improvement of an under-seat structure of a vehicle.

2. Description of Background Art

An under-seat structure of a vehicle is known wherein the under-seat structure includes a power source which is constituted of an engine, a transmission and the like that is arranged below seats. See, for example, Japanese Patent 2605671.

As shown in FIG. 2 of Japanese Patent 2605671, in the vehicle, an engine 2, a transmission 3 and a transfer 4 which constitute the power source are mounted on a vehicle body frame 1, and the transmission 3 and the transfer 4 are arranged below a seat 9.

The above-mentioned engine 2, transmission 3, and transfer 4 generate heat during driving. Thus, it is necessary to prevent the heat from being transmitted to an occupant sitting on the seat 9. Further, the transmission 3 and the transfer 4 require maintenance such as changing the oil periodically. Thus, there has been a demand for a structure which can simplify the maintenance.

SUMMARY AND OBJECTS OF THE INVENTION

It is an object of the present invention to provide a countermeasure to cope with heat which is transmitted to an occupant and to enhance the maintenance property.

According to an embodiment of the present invention, a vehicle which supports an engine on a vehicle body frame, mounts an oil level gauge and an engine oil supply pipe on the engine, and arranges the engine below a pair of left and right seats, wherein the seats are detachably mounted on the vehicle body frame. An inner cover is arranged between the seats and the engine with a maintenance lid which allows for the maintenance of the oil level gauge and the engine oil supply pipe being formed on the inner cover. The inner cover is detachably mounted on the vehicle body frame.

With respect to the manner of operation of the inner cover, heat which is generated from the engine is blocked by the inner cover thus preventing the heat from being transmitted to an occupant sitting on the seat. Further, by removing the seat from the vehicle body frame and, thereafter, by removing the inner cover from the vehicle body frame, the engine is exposed. Thus, the maintenance of an ignition plug of the engine, for example, becomes possible.

Further, as the manner of operation of the maintenance lid which is mounted on the inner cover, by removing the seat from the vehicle body frame and, thereafter, by opening the maintenance lid, the oil level gauge of the engine and the engine oil supply pile are exposed. Accordingly, it becomes possible to inspect a quantity of the engine oil by the oil level gauge and to supply the oil from the engine oil supply pipe.

According to an embodiment of the present invention, an upper end of a cylinder portion provided to the engine is arranged above an upper end of the vehicle body frame.

With respect to the manner of operation of the arrangement of the cylinder portion, by arranging the upper end of a cylinder portion above the upper end of the vehicle body frame, for example, the ignition plug which is mounted on the cylinder head of the cylinder portion is arranged at a further elevated position. Thus, the ignition plug can be more easily mounted or dismounted.

According to an embodiment of the present invention, a cap which closes an oil supply port is mounted on the engine oil supply pipe with the cap being arranged above the upper end of the vehicle body frame.

With respect to the manner of operation of the arrangement of the cap, by arranging the cap above the upper end of the vehicle body frame, the cap is positioned further above the vehicle body frame. Thus, after opening the cap, the engine oil from the oil supply port can be easily supplied. Further, when the vehicle is immersed in water, water hardly reaches the cap.

According to an embodiment of the present invention, a cylinder head of the engine is arranged below a rear portion between the pair of left and right seats, and the inner cover includes an extending portion which extends over above the cylinder head.

Due to the elimination of the extending portion from the cylinder head by removing the inner cover, an occupant can get access to the cylinder portion thus enhancing the maintenance property of the vehicle.

According to an embodiment of the present invention, the engine oil supply pipe and the oil level gauge are arranged below the maintenance lid of the inner cover. Thus, it is possible to perform a periodical inspection by merely opening the maintenance lid.

According to an embodiment of the present invention, a cylinder head of the engine is arranged below a rear portion of the inner cover. By removing the inner cover, the cylinder head can be exposed. Thus, it is possible to perform the maintenance of the engine.

According to an embodiment of the present invention, the seats are detachably mounted on the vehicle body frame with the inner cover being arranged between the seats and the engine. The maintenance lid is formed on the inner cover and the inner cover is detachably mounted on the vehicle body frame. Thus, it is possible to prevent heat from the engine from being transmitted to an occupant by the inner cover.

Further, by exposing the inner cover by removing the seat and by opening the maintenance lid of the inner cover, the inspection of a quantity of the engine oil by the oil level gauge and the supply of oil from the engine oil supply pipe can be easily performed. Thus, the maintenance property can be enhanced. Further, by removing the inner cover, the whole engine can be exposed. Thus, it is possible to easily perform maintenance of other parts of the engine such as, for example, an ignition plug.

According to an embodiment of the present invention, the upper end of the cylinder portion of the engine is arranged above the upper end of the vehicle body frame. Thus, for example, the position of the ignition plug which is mounted on the cylinder head can be elevated thus further simplifying the maintenance.

According to an embodiment of the present invention, the cap which closes the oil supply port is mounted on the engine oil supply pipe and the cap is arranged above the upper end of the vehicle body frame. Thus, the position of the cap can be elevated whereby it is possible to more easily supply engine oil from the oil supply port by removing the cap from the oil supply port. Further, even when the vehicle is immersed in water, water hardly reaches the cap. Thus, it is possible to make it difficult for water to enter from the oil supply port.

According to an embodiment of the present invention, the cylinder head of the engine is arranged below the rear portion between the pair of left and right seats, and the inner cover includes the extending portion which extends over above the cylinder head. Thus, it is possible to expose the cylinder portion thus enhancing the maintenance property of the vehicle.

According to an embodiment of the present invention, the engine oil supply pipe and the oil level gauge are arranged below the maintenance lid of the inner cover. Thus, it is possible to perform a periodical inspection by merely opening the maintenance lid.

According to an embodiment of the present invention, a cylinder head of the engine is arranged below the rear portion of the inner cover. Thus, it is possible to expose the cylinder head by removing the inner cover thus enabling maintenance of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a best mode for carrying out the present invention is explained in conjunction with attached drawings. Here, the drawings are viewed in the direction of symbols.

Figure 1:
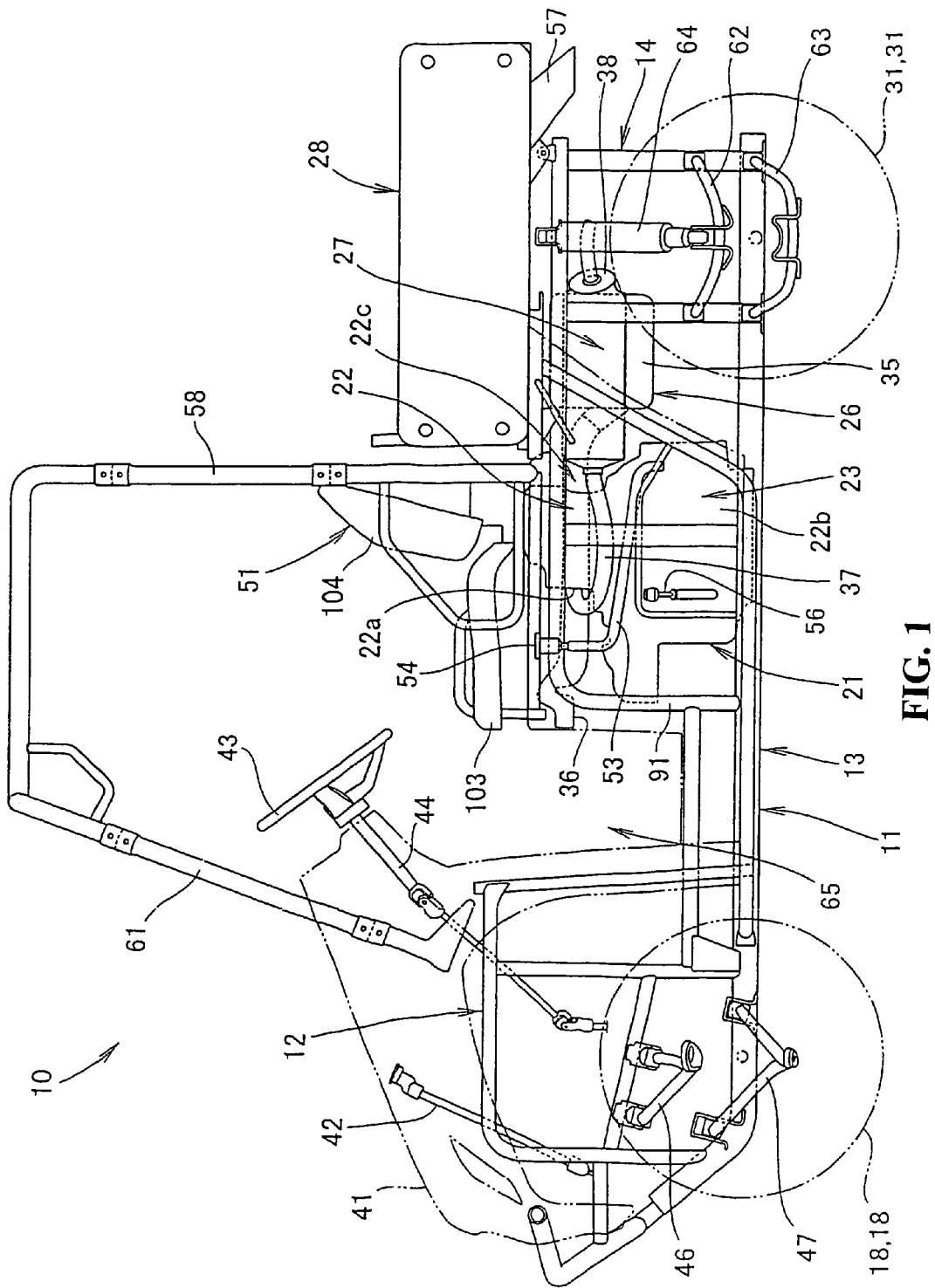
FIG. 1 is a side view of a vehicle which adopts an under-seat structure according to the present invention.

FIG. 1 is a side view of a vehicle which adopts an under-seat structure according to the present invention. The vehicle 10 is a two-seater four-wheel drive vehicle, which includes a vehicle body frame 11 having a front frame 12, a center frame 13 and a rear frame 14, left and right front wheels 18, 18. A power unit 21 includes an engine 22 and a transmission 23 which are mounted on the center frame 13. An intake device 26 is connected to an upper rear portion of the engine 22 for supplying air and fuel to the engine 22. An exhaust device 27 extends rearwardly from an upper front portion of the engine 22. A carrier 28 is mounted on an upper portion of the rear frame 14 in an inclinable manner. The vehicle 10 also includes left and right rear wheels 31, 31.

The intake device 26 includes a throttle body (not shown in the drawing) which is connected to a rear portion of the cylinder head 22a of the engine 22, an air cleaner 35 which is connected to the rear end side of the throttle body and an intake duct 36 which extends frontwardly from the air cleaner 35.

The exhaust device 27 includes an exhaust pipe 37 which is connected to a front portion of the cylinder head 22a and extends rearwardly, and a muffler 38 which is connected to a rear end of the exhaust pipe 37.

A front cover 41 is provided together with a radiator 42, a handle 43 and a steering shaft 44. An upper arm 46 for supporting the front wheel is provided together with a lower arm 47 for supporting the front wheel, left and right seats 51, 51 which are mounted on the center frame 13 (in the drawings, only the reader's side is indicated by symbol 51). An engine oil supply pipe 53 is mounted on a crankcase 22b of the engine 22. A cap 54 is mounted on a distal end of the engine oil supply pipe 53. An oil level gauge 56 is mounted on a side portion of the crankcase 22b. Rear fenders 57, 57 (showing only the reader's side indicated by symbol 57) are provided together with left and right roll rods 58, 58 (showing only the reader's side indicated by symbol 58) which are elevated on the center frame 13. Upper frames 61, 61 (showing only reader's side indicated by symbol 61) are provided which extend between the front frame 12 and the roll rods 58, 58. An upper arm 62 is provided for supporting the rear wheel together with a lower arm 63 for supporting the rear wheel. Rear shock absorbers 64, 64 (showing only reader's side indicated by symbol 64) are provided. A cabin 65 constitutes a crew member's space arranged behind the upper frame 61 and in front of the roll rod 58.

Figure 2:
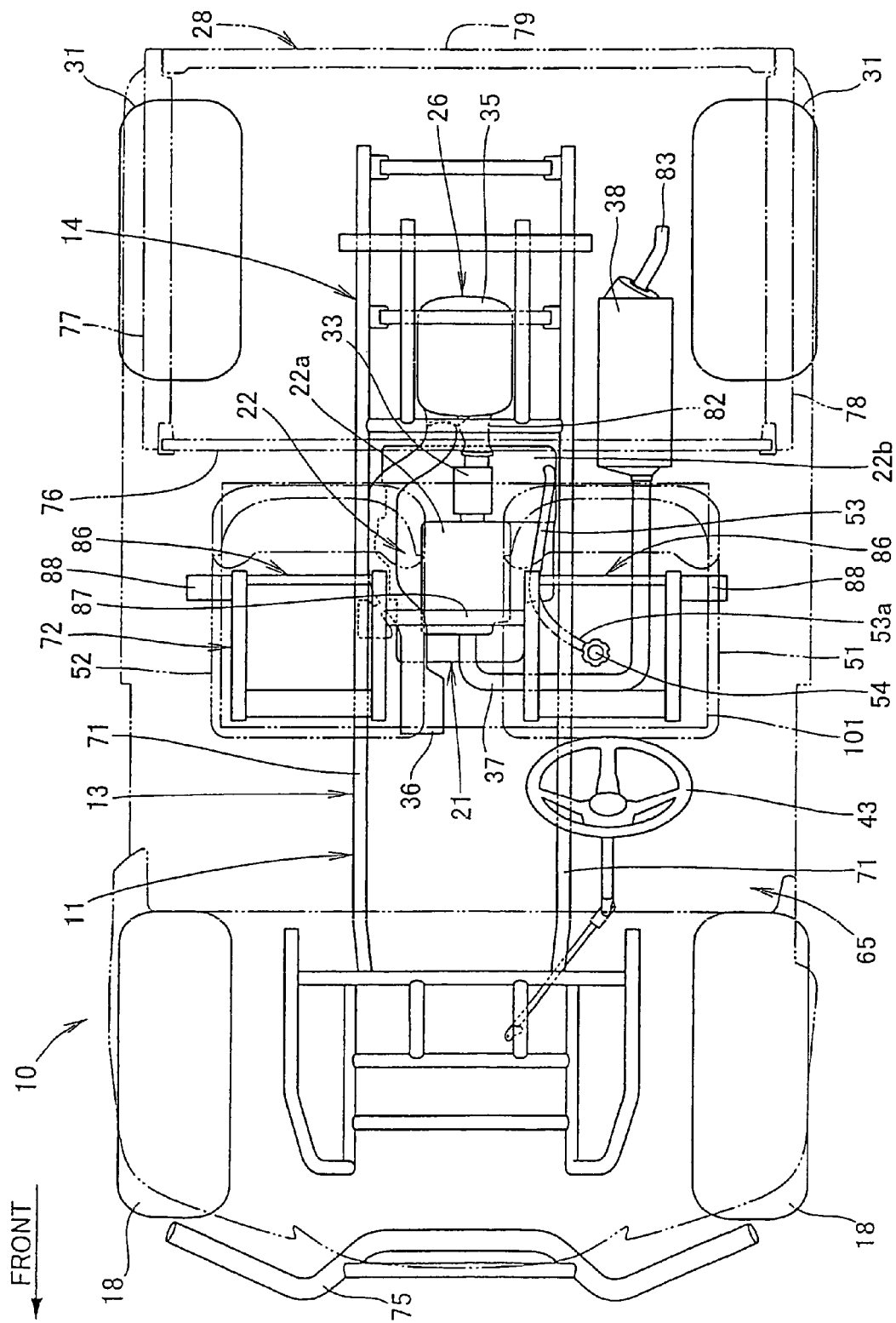
FIG. 2 is a plan view of the vehicle according to the present invention.

FIG. 2 is a plan view (an arrow (FRONT) in the drawing indicating a front portion of the vehicle) of a vehicle according to the present invention. In FIG. 2, a pair of left and right main frames 71, 71 is mounted on the center frame 13 and the rear frame 14 of the vehicle body frame 11, a seat frame member 72 is mounted on the main frames 71, 71, left and right seats 51, 52 are mounted on the seat frame member 72, the power unit 21 and the exhaust device 26 are arranged between the left and right main frames 71, 71, and a portion of the exhaust pipe 37 which extends from a front portion of the cylinder head 22a of the engine 22 and the muffler 38 are arranged on an outside of the left-side main frame 71. A bumper frame 75 is provided together with frame members 76 to 79 of the carrier 28.

The throttle body 33 which constitutes the exhaust device 26 is connected to a rear portion of the cylinder head 22a of the engine 22 with the air cleaner 35 being mounted on a rear end of the throttle body 33 by way of a connecting tube 82. The air cleaner 35 is positioned at a center portion between the left and right main frames 71, 71.

The intake duct 36 extends in the frontward direction of the vehicle body in a state wherein the intake duct 36 is bent so as to approach to the right-side main frame 71 from a front portion of the air cleaner 35 and a right side of the connecting tube 82. Thereafter, the intake duct 36 extends frontwardly along the main frame 71. Further, the intake duct 36 extends frontwardly after being bent away from the main frame 71. A front end portion of the intake duct 36 includes an opening which constitutes an intake opening (explained later in detail).

The exhaust pipe 37 of the exhaust device 27 extends in the frontward direction of the vehicle body from a front portion of the cylinder head 22a and then extends in the left direction of the vehicle body. Further, after traversing the main frame 71, the exhaust pipe 37 extends rearwardly along the main frame 71 and is connected to the muffler 38. Here, also the muffler 38 extends rearwardly along the main frame 71. A tail pipe 83 is provided to a rear end of the muffler 38 and extends in the rearward and oblique left direction from the muffler 38 with a rear end of the tail pipe 83 facing rearwardly.

The engine oil supply pipe 53 extends in substantially the frontward direction of the vehicle body from the crankcase 22b of a rear left corner portion of the power unit 21 and crosses the main frame 71 by being bent in the left direction gradually and gently. Thereafter, a distal end portion 53a and the cap portion 54 of the engine oil supply pipe 53 are positioned at the outside of the main frame 71.

The seat frame member 72 includes seat frame members 86, 86 which are mounted on the main frames 71, 71 side for supporting the seats 51, 52, a connection frame 87 which connects the respective seat frame members 86, 86, and a side frame 88 which projects sideward from the respective seat frame members 86, 86.

Figure 3:
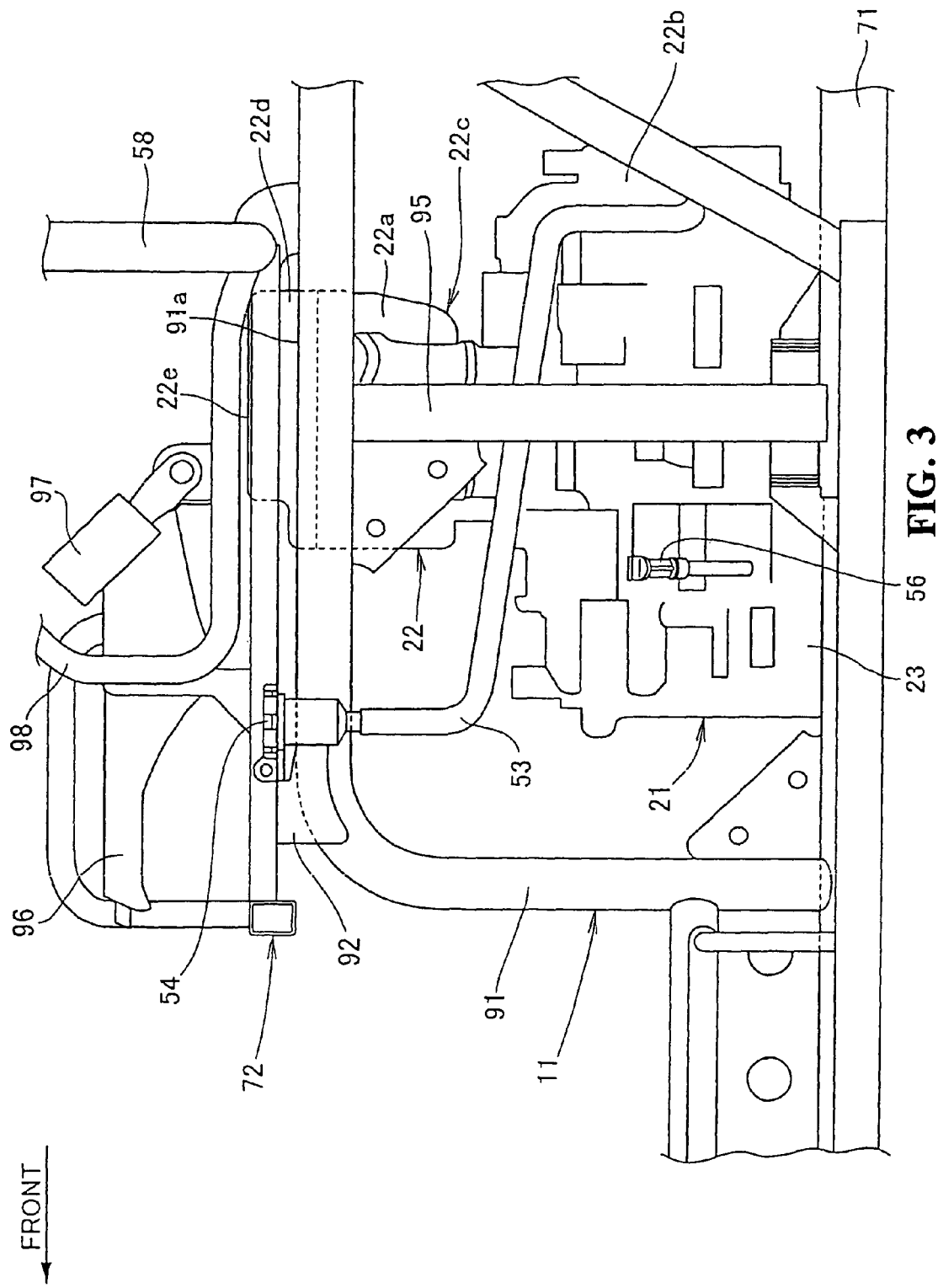
FIG. 3 is a side view of an essential part of the vehicle according to the present invention.

FIG. 3 is a side view of an essential part of the vehicle according to the present invention. In FIG. 3, upper frames 91 which have an L-shape as viewed in a side view are respectively mounted on main frames 71, 71 (showing only reader's side main frame indicated by numeral 71), and the seat frame member 72 is mounted on the pair of left and right upper frames 91, 91 (showing only reader's side upper frame indicated by numeral 91) by way of a plurality of frame support members 92. Vertical frames 95 extend between the main frames 71 and the upper frames 91. A side brake lever 96 is provided. A buckle 97 of a seatbelt is mounted on the frame. An armrest 98 is provided. The side brake lever 96 and the buckle 97 are supported on the seat frame member 72, and the armrest 98 is supported on a roll rod 58.

The engine 22 includes a cylinder portion 22c that projects upwardly. The cylinder portion 22c includes a cylinder block (not shown in the drawing) which is mounted on a crankcase 22b with a cylinder head 22a mounted on an upper portion of the cylinder block and a head cover 22d mounted on an upper portion of the cylinder head 22a.

An upper end of the cylinder portion 22c, that is, an upper end 22e of the head cover 22d is positioned above an upper end 91a of the upper frame 91. Accordingly, the head cover 22d and the cylinder head 22a are arranged at an elevated position. Thus, for example, it is possible to easily perform maintenance of an ignition plug (not shown in the drawing) which is mounted on the cylinder head 22a from above the cylinder head 22a.

A cap 54 is provided to an engine oil supply pipe 53 that is arranged above the upper end 91a of the upper frame 91. By arranging the cap 54 at a further elevated position, even when the vehicle is immersed in water, the cap 54 is hardly immersed in water. Thus, it is possible to make the intrusion of water from an opening of the engine oil supply pipe 53 difficult.

Figure 4:
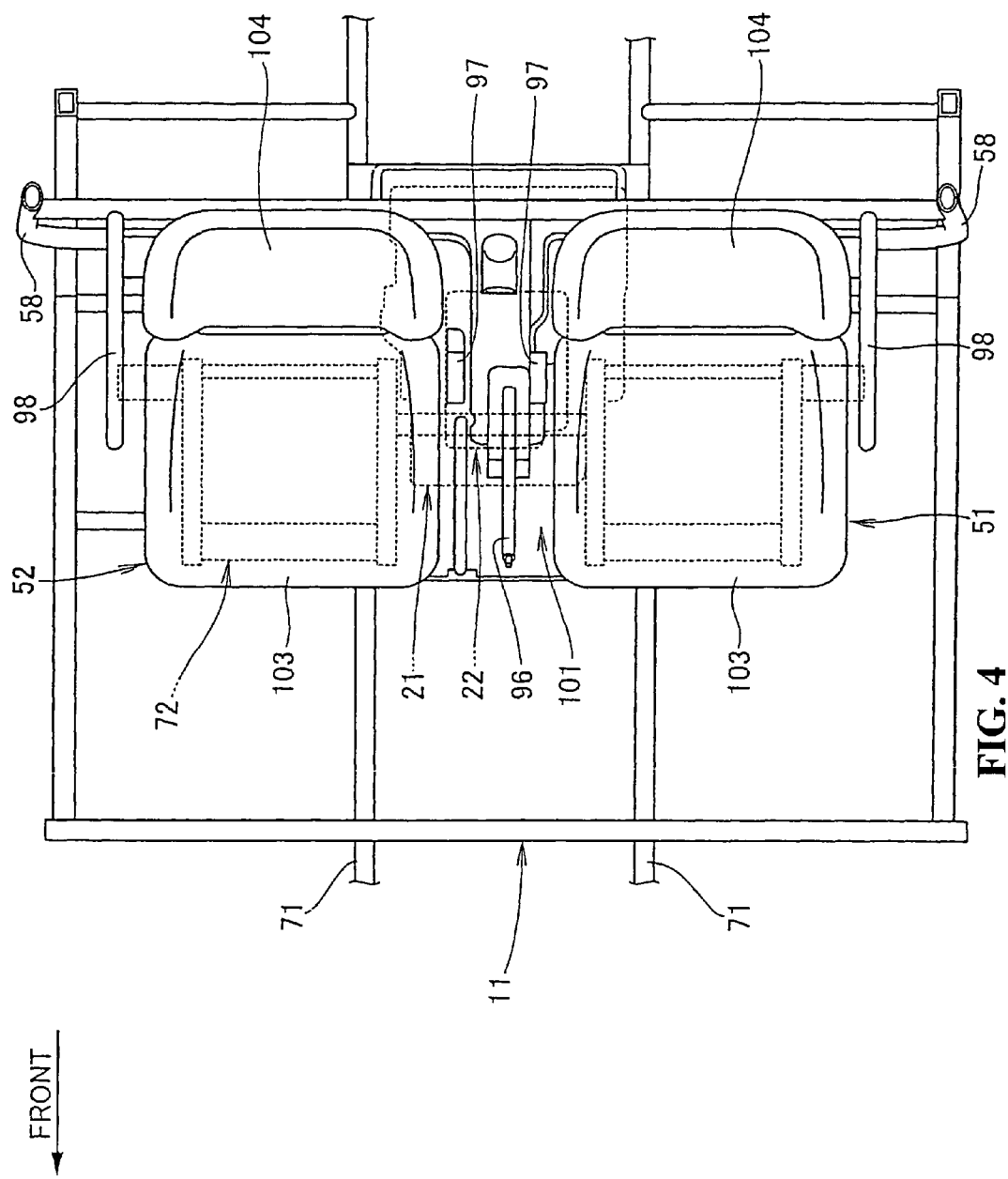
FIG. 4 is a plan view of an essential part of the vehicle according to the present invention.

FIG. 4 is a plan view of an essential part of the vehicle according to the present invention. In FIG. 4, below the left and right seats 51, 52, an inner cover 101 is arranged for covering the power unit 21 including the engine 22 from above. A mounting portion is provided for mounting a side brake lever 96 and the buckles 97, 97 on a seat frame member 72 (see FIG. 2) that is covered with the inner cover 101.

A driver sits on a left seat 51, and an occupant sits on the right seat 52, wherein each seat includes a seat cushion 103 and a seat back 104.

The manner of operation of the inner cover 101 described above is explained hereinafter.

Figure 5:
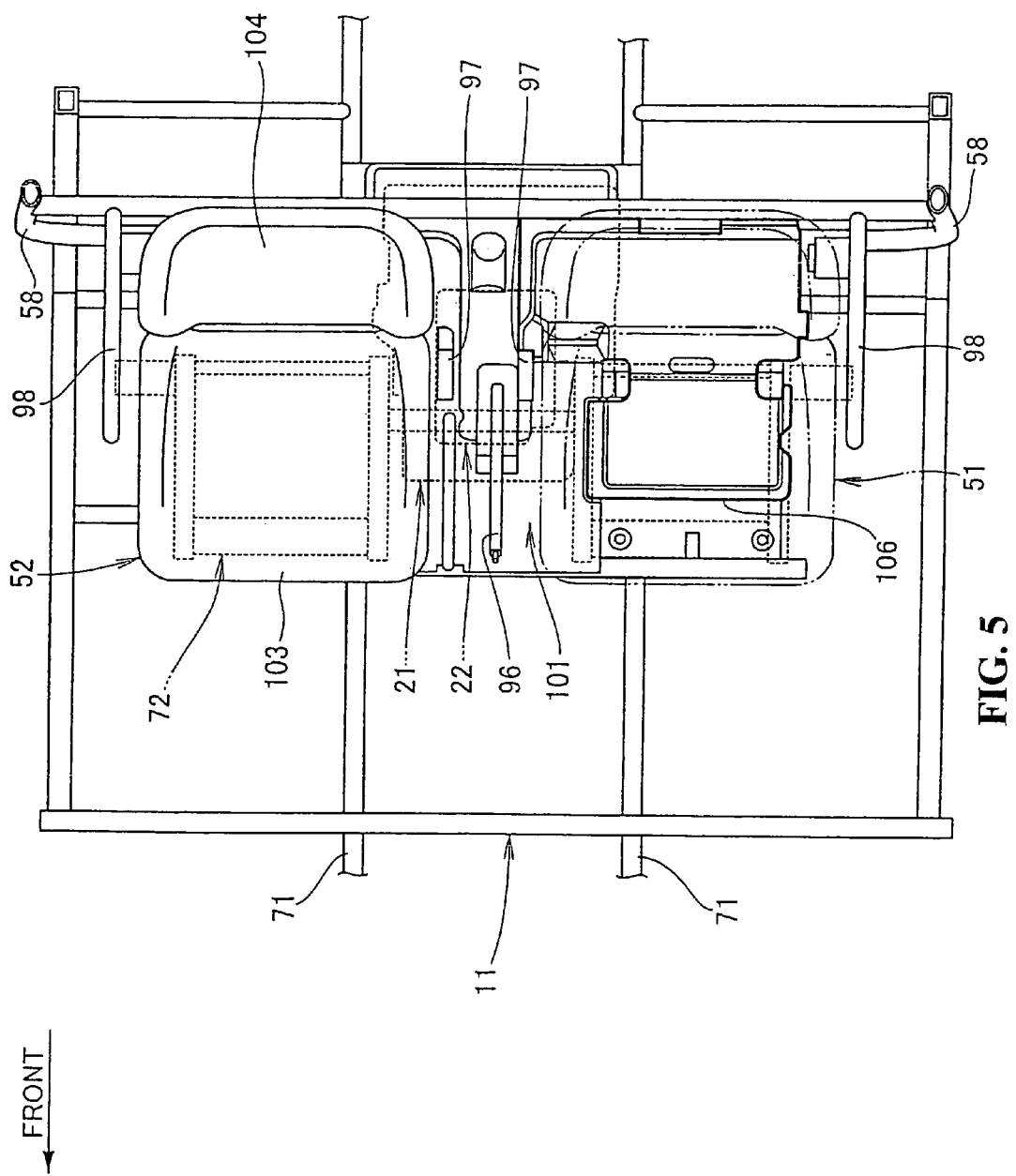
FIG. 5 is a first operational view showing an operation of an inner cover according to the present invention.

FIG. 5 is a first operational view showing the manner of operation of the inner cover according to the present invention.

When the seat 51 is removed from the seat frame member 72 arranged in a state shown in FIG. 4, a maintenance lid 106 (a profile thereof being indicated by a bold line) which is detachably mounted on the inner cover 101 is exposed as shown in FIG. 5.

Figure 6:
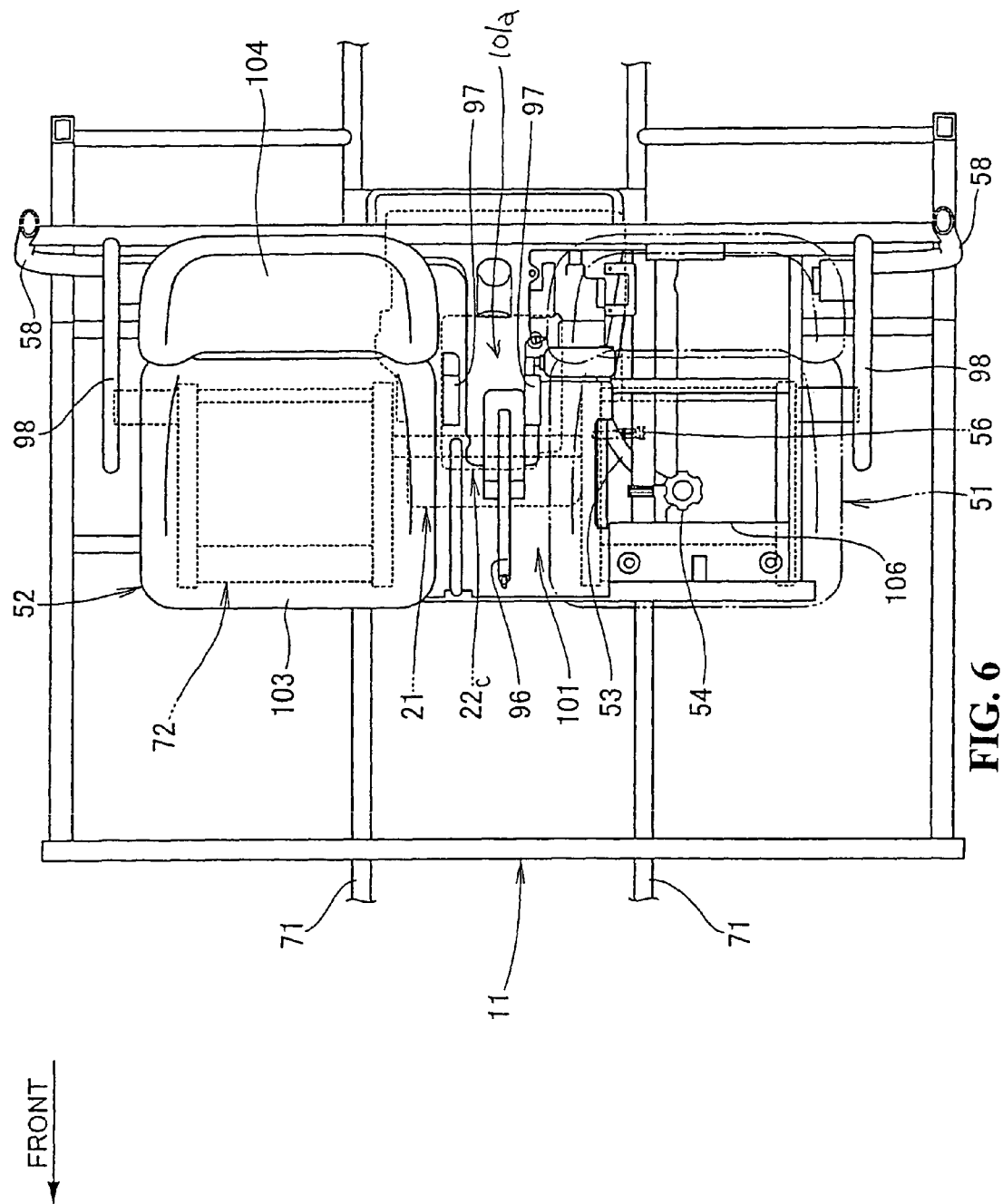
FIG. 6 is a second operational view showing an operation of an inner cover according to the present invention.

FIG. 6 is a second operational view showing the manner of operation of the inner cover according to the present invention.

When the maintenance lid 106 is removed from the inner cover 101 arranged in a state shown in FIG. 5, a portion of the engine 22 of the power unit 21 is exposed as shown in FIG. 6. Since the driver can observe the cap 54 of the engine oil supply pipe 53 and the oil level gauge 56 as shown in the drawing, the driver can supply the engine oil from the engine oil supply pipe 53 by removing the oil cap 54 or can confirm a quantity of engine oil using an oil level gauge 56 after removing the cap 54. An extending portion 101a of the inner cover 101 is provided which extends upwardly from a cylinder portion 22c.

Figure 7:
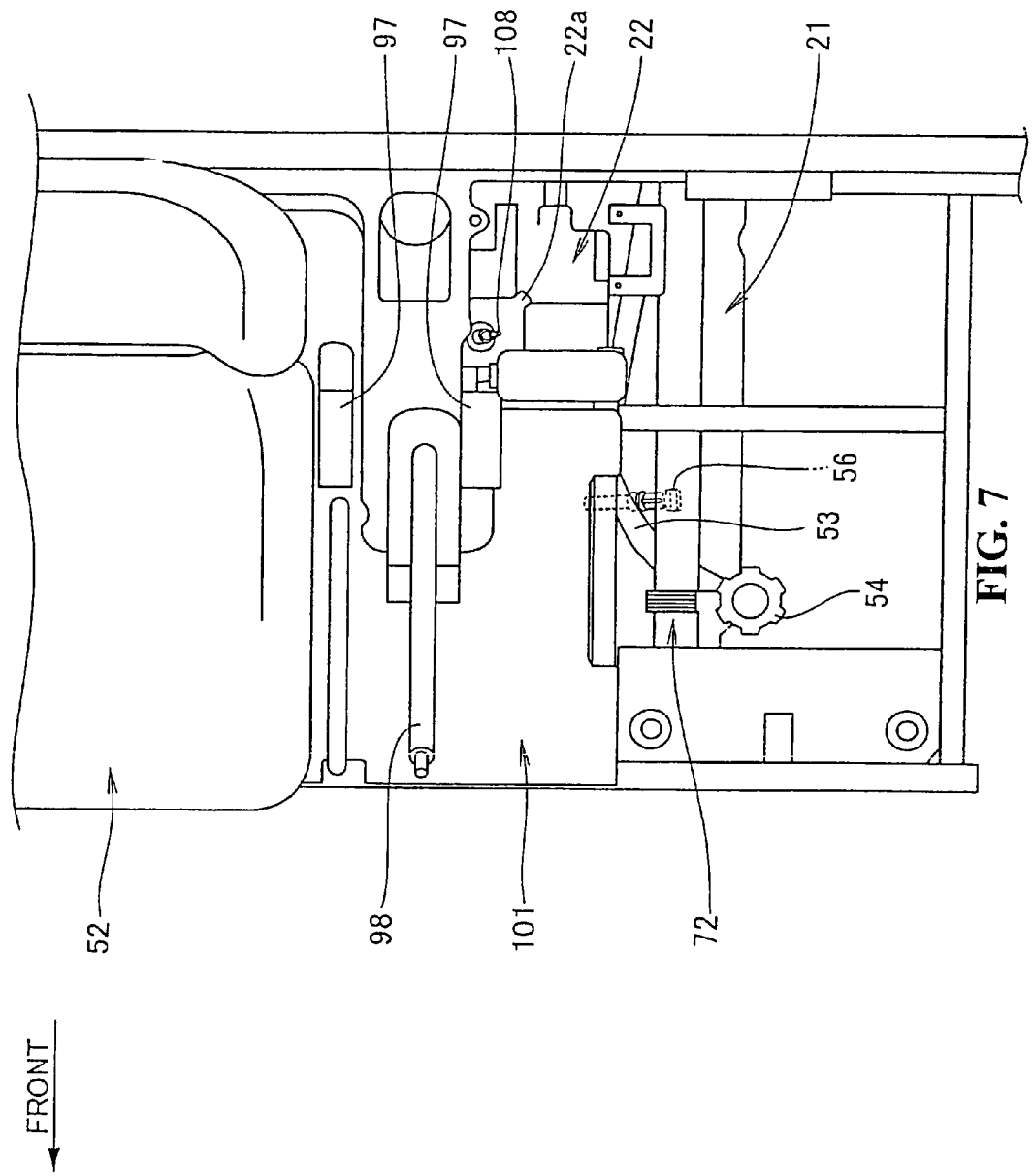
FIG. 7 is a third operational view showing an operation of an inner cover according to the present invention.

FIG. 7 is a third operational view showing the manner of operation of the inner cover according to the present invention and illustrating an opening portion of the inner cover 101 shown in FIG. 6 in an enlarged manner.

The inner cover 101 is detachably mounted on the seat frame member 72. Thus, when the whole inner cover 101 is removed, it is possible to easily mount and dismount the ignition plug 108 which is mounted on the cylinder head 22a.

The confirmation (maintenance) of the engine oil or the like which requires an inspection before riding can be performed by opening the lid. The inspection (maintenance) of the ignition plug or the like, which is a periodical inspection and is not performed as frequently as the inspection before riding, can be performed by getting access to the ignition plug by removing the inner cover.

Further, in FIG. 4, since the inner cover 101 is arranged between the engine 22 and the seats 51, 52, it is possible to prevent heat generated from the engine 22 and the exhaust pipe 37 from being transmitted to the seat 51, 52 sides. Although the inner cover 101 is a partition wall which partitions a cabin and the outside of the vehicle, the inner cover 101 can also be used as a heat blocking plate as described above.

As shown in FIGS. 3 and 5, an embodiment of the present invention provides a vehicle 10 (see FIG. 2) which supports the engine 22 on the vehicle body frame 11, mounts the engine oil supply pipe 53 and the oil level gauge 56 on the engine 22, and arranges the engine 22 below a pair of left and right seats 51, 52, wherein the seats 51, 52 are detachably mounted on the vehicle body frame 11, more specifically, to the seat frame member 72. The inner cover 101 is arranged between the seats 51, 52 and the engine 22. The maintenance lid 106 which allows for the maintenance of the engine oil supply pipe 53 and the oil level gauge 56 is formed on the inner cover 101. The inner cover 101 is detachably mounted on the vehicle body frame 11.

Due to such a construction, it is possible to prevent the heat of the engine 22 from being transmitted to the occupant by the inner cover 101.

Further, by exposing the inner cover 101 by removing the seats 51, 52 and, thereafter, by opening the maintenance lid 106 of the inner cover 101, the inspection of a quantity of the engine oil by the oil level gauge 56 and the supply of the oil from the engine oil supply pipe 53 can be easily performed thus enhancing the maintenance property.

Further, by removing the inner cover 101 from the vehicle body frame 11, to be more specific, the seat frame member 72, whole engine 22 can be exposed. Thus, it is possible to easily perform the maintenance of other portions of the engine 22 such as, for example, the ignition plug 108 (see FIG. 6).

As shown in FIG. 3, an embodiment of the present invention provides an upper end of the cylinder portion 22c provided to the engine 22 (the upper end 22e of the head cover 22d) which is arranged above the upper end of the vehicle body frame 22, to be more specific, above the upper end 91a of the upper frame 91.

Since the upper end of the cylinder portion 22c provided to the engine 22 is arranged above the upper end 91a of the upper frame 91, the position of the ignition plug 108 which is mounted on the cylinder head 22a is elevated thus further simplifying the maintenance.

An embodiment of the present invention provides a cap 54 which closes the oil supply port is mounted on the engine oil supply pipe 53, and the cap 54 is arranged above the upper end 91a of the upper frame 91.

Since the cap 54 is arranged above the upper end 91a of the upper frame 91, the position of the cap 54 is elevated. Thus, after opening the cap 54, the supply of the engine oil from the oil supply port can be further easily performed. Further, even when the vehicle is immersed in water, water hardly reaches the cap 54. Thus, it is possible to make the intrusion of water from the oil supply port difficult.

An embodiment of the present invention provides a cylinder head 22a of the engine 22 is arranged below the rear portion between the pair of left and right seats 51, 52, and the inner cover 101 includes the extending portion 101a which extends over above the cylinder head 22a.

Due to such a construction, it is possible to expose the cylinder portion 22c thus enhancing the maintenance property of the vehicle.

An embodiment of the present invention provides a engine oil supply pipe and the oil level gauge are arranged below the maintenance lid 106 of the inner cover 101.

Due to such a construction, it is possible to perform a periodical inspection by merely opening the maintenance lid.

An embodiment of the present invention provides a cylinder head of the engine is arranged below the rear portion of the inner cover.

Due to such a construction, it is possible to expose the cylinder by removing the inner cover thus enabling the maintenance of the engine.

In the present invention, the seats are detachably mounted on the vehicle body frame. However, the present invention is not limited to such a constitution, and it is possible to movably or swingably mount the seats on the vehicle body frame. Due to such a construction, the seat can restore an original state after the maintenance is completed.

Further, in the embodiment as shown in FIG. 6, although the maintenance lid 106 is mounted below the seat, it is possible to divide the maintenance lid 106 into a plural number of maintenance lids and, thereafter, to mount or dismount some maintenance lids which are necessary for maintenance.

An under-seat structure of the present invention is preferably used in a vehicle which arranges an engine below a seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An under-seat structure of a road vehicle for supporting an engine on a vehicle body frame wherein an oil level gauge and an engine oil supply pipe are mounted on the engine comprising:
   at least one seat being detachably mounted on the vehicle body frame with the engine being mounted below the at least one seat;
   an inner cover disposed between the at least one seat and the engine, said inner cover defining a heat shield for reducing heat from the engine to the at least one seat;
   wherein the oil level gauge is mounted on a side portion of a crankcase and the engine oil supply pipe extends in substantially the frontward direction of the vehicle body from the crankcase of a rear left corner portion of a power unit and crosses a main frame by being gradually bent in a lateral direction, a distal end portion and a cap portion of the engine oil supply pipe being positioned at the outside of the main frame, and
   a maintenance lid for allowing the maintenance of the oil level gauge and the engine oil supply pipe, said maintenance lid being formed in the inner cover, and the inner cover being detachably mounted on the vehicle body frame, said maintenance lid providing access to said oil level gauge and said oil supply pipe without detaching the inner cover.

2. The under-seat structure of a vehicle according to claim 1, wherein a cylinder portion of the engine has an upper end thereof positioned above an upper end of the vehicle body frame.

3. The under-seat structure of a vehicle according to claim 1, wherein a cap for closing an oil supply port is mounted on the engine oil supply pipe, with the cap being arranged above the upper end of the vehicle body frame.

4. The under-seat structure of a vehicle according to claim 2, wherein a cap for closing an oil supply port is mounted on the engine oil supply pipe, with the cap being arranged above the upper end of the vehicle body frame.

5. The under-seat structure of a vehicle according to claim 1, wherein a cylinder head of the engine is positioned below a rear portion between a pair of left and right seats, and the inner cover includes an extending portion for extending over and above the cylinder head.

6. The under-seat structure of a vehicle according to claim 1, wherein the engine oil supply pipe and the oil level gauge are arranged below the maintenance lid of the inner cover.

7. The under-seat structure of a vehicle according to claim 1, wherein a cylinder head of the engine is arranged below a rear portion of the inner cover.

8. The under-seat structure of a vehicle according to claim 1, wherein the maintenance lid is divided into a plurality of lids for allowing maintenance of the vehicle.

9. The under-seat structure of a vehicle according to claim 1, wherein the engine oil supply pipe includes a proximal end that is connected to the engine and a distal end that extends from the engine to the front of the vehicle and upwardly to be positioned above an upper end of the vehicle body frame.

10. An under-seat structure for a road vehicle comprising:
    a vehicle body frame;
    an engine operatively mounted on the vehicle body frame;
    an oil level gauge operatively connected to the engine;
    an engine oil supply pipe operatively connected to the engine;
    at least one seat being detachably mounted on the vehicle body frame with the engine being mounted below the at least one seat;

an inner cover disposed between the at least one seat and the engine, said inner cover defining a heat shield for reducing heat from the engine to the at least one seat;

wherein the oil level gauge is mounted on a side portion of a crankcase and the engine oil supply pipe extends in substantially the frontward direction of the vehicle body from the crankcase of a rear left corner portion of a power unit and crosses a main frame by being gradually bent in a lateral direction, a distal end portion and a cap portion of the engine oil supply pipe being positioned at the outside of the main frame, and a maintenance lid for allowing the maintenance of the oil level gauge and the engine oil supply pipe, said maintenance lid being formed in the inner cover with the inner cover being detachably mounted on the vehicle body frame, said maintenance lid providing access to said oil level gauge and said oil supply pipe without detaching the inner cover.

11. The under-seat structure of a vehicle according to claim 10, wherein a cylinder portion of the engine has an upper end thereof positioned above an upper end of the vehicle body frame.

12. The under-seat structure of a vehicle according to claim 10, wherein a cap for closing an oil supply port is mounted on the engine oil supply pipe, with the cap being arranged above the upper end of the vehicle body frame.

13. The under-seat structure of a vehicle according to claim 11, wherein a cap for closing an oil supply port is mounted on the engine oil supply pipe, with the cap being arranged above the upper end of the vehicle body frame.

14. The under-seat structure of a vehicle according to claim 10, wherein a cylinder head of the engine is positioned below a rear portion between a pair of left and right seats, and the inner cover includes an extended portion for extending over and above the cylinder head.

15. The under-seat structure of a vehicle according to claim 10, wherein the engine oil supply pipe and the oil level gauge are arranged below the maintenance lid of the inner cover.

16. The under-seat structure of a vehicle according to claim 10, wherein a cylinder head of the engine is arranged below a rear portion of the inner cover.

17. The under-seat structure of a vehicle according to claim 10, wherein the maintenance lid is divided into a plurality of lids for allowing maintenance of the vehicle.

18. The under-seat structure of a vehicle according to claim 10, wherein the engine oil supply pipe includes a proximal end that is connected to the engine and a distal end that extends from the engine to the front of the vehicle and upwardly to be positioned above an upper end of the vehicle body frame.

19. An under-seat structure of a road vehicle for supporting an engine on a vehicle body frame wherein an oil level gauge and an engine oil supply pipe are mounted on the engine comprising:

a pair of left and right seats detachably mounted on the vehicle body frame, with the engine, containing a cylinder head, being mounted below the left and right seats;

an inner cover disposed between the pair of left and right seats and the engine, said inner cover defining a heat shield for reducing heat from the engine to the seats;

wherein the oil level gauge is mounted on a side portion of a crankcase and the engine oil supply pipe extends in substantially the frontward direction of the vehicle body from the crankcase of a rear left corner portion of a power unit and crosses a main frame by being gradually bent in a lateral direction, a distal end portion and a cap portion of the engine oil supply pipe being positioned at the outside of the main frame, and a maintenance lid for allowing the maintenance of the oil level gauge and the engine oil supply pipe, said maintenance lid being formed in the inner cover, and the inner cover being detachably mounted on the vehicle body frame, wherein the inner cover includes an extended portion for extending upwardly over the cylinder head.

20. The under-seat structure of a vehicle according to claim 19, wherein the seats are provided with seat frame members which are mounted on a pair of left and right upper frames having an L-shaped configuration.

21. The under-seat structure of a vehicle according to claim 20, wherein an upper end portion of the cylinder head is positioned above the upper frames.

22. The under-seat structure of a vehicle according to claim 21 wherein a side brake and buckles are mounted on the seat frame members which are covered by inner cover.

* * * * *